United States Patent [19]

Hammer

[11] Patent Number: 4,829,376
[45] Date of Patent: May 9, 1989

[54] METHOD FOR DATA REDUCTION OF DIGITAL VIDEO SIGNALS BY VECTOR QUANTIZATION OF COEFFICIENTS ACQUIRED BY ORTHONORMAL TRANSFORMATION WITH A SYMMETRICAL NEARLY, CYCLICAL HADAMARD MATRIX

[75] Inventor: Bernard Hammer, Pfaffing, Fed. Rep. of Germany

[73] Assignee: Siemens Aktiengesellschaft, Berlin and Munich, Fed. Rep. of Germany

[21] Appl. No.: 253,366

[22] Filed: Sep. 30, 1988

Related U.S. Application Data

[63] Continuation of Ser. No. 32,176, Mar. 30, 1987, abandoned.

[30] Foreign Application Priority Data

Apr. 4, 1986 [DE] Fed. Rep. of Germany ....... 3611309

[51] Int. Cl.$^4$ ............................................. H04N 7/12
[52] U.S. Cl. ........................... 358/133; 358/136
[58] Field of Search ............... 358/133, 135, 136, 141; 325/27, 122

[56] References Cited

U.S. PATENT DOCUMENTS

| | | | |
|---|---|---|---|
| 4,047,221 | 9/1977 | Yasuda et al. | 358/136 |
| 4,051,530 | 9/1977 | Kuroda et al. | 358/136 |
| 4,307,420 | 12/1981 | Ninomiya et al. | 358/136 |
| 4,558,350 | 12/1985 | Murakami | 358/133 X |
| 4,597,010 | 6/1986 | Carr | 358/133 X |
| 4,689,672 | 8/1987 | Furakawa et al. | 358/126 |

OTHER PUBLICATIONS

Siemens Forsch.-u. Entwickl.-Ber., vol. 13 (1984) No. 3, entitled "Transform Coding Of Digitized Images Signals", pp. 105–108.
Frequenz 39 (1985) 7/8 entitled "Transform Coding Of Image Sequences With The M-Hadamard Transform", pp. 226–234.

*Primary Examiner*—James J. Groody
*Assistant Examiner*—Victor R. Kostak
*Attorney, Agent, or Firm*—Hill, Van Santen, Steadman & Simpson

[57] ABSTRACT

A method for data reduction of digital video signals by vector quantization of coefficients acquired by orthonormal transformation with a symmetrical, nearly cyclical Hadamard matrix, employs formation of a mean value coefficient and a plurality of structure coefficients from a plurality of blocks formed from the input signal in a Peano curve arrangement, these coefficients being in part only scalarly quantized and in part both scalarly as well as vectorially quantized. The quantization takes place in a coder having at least two stages interconnected cascade-like. The reconstruction of the video signal takes place in a decoder, having an identical plurality of stages. The method allows the noise amplitude of the video signal acquired after back-transformation to be adapted to the visibility thresholds of the human visual system.

5 Claims, 3 Drawing Sheets

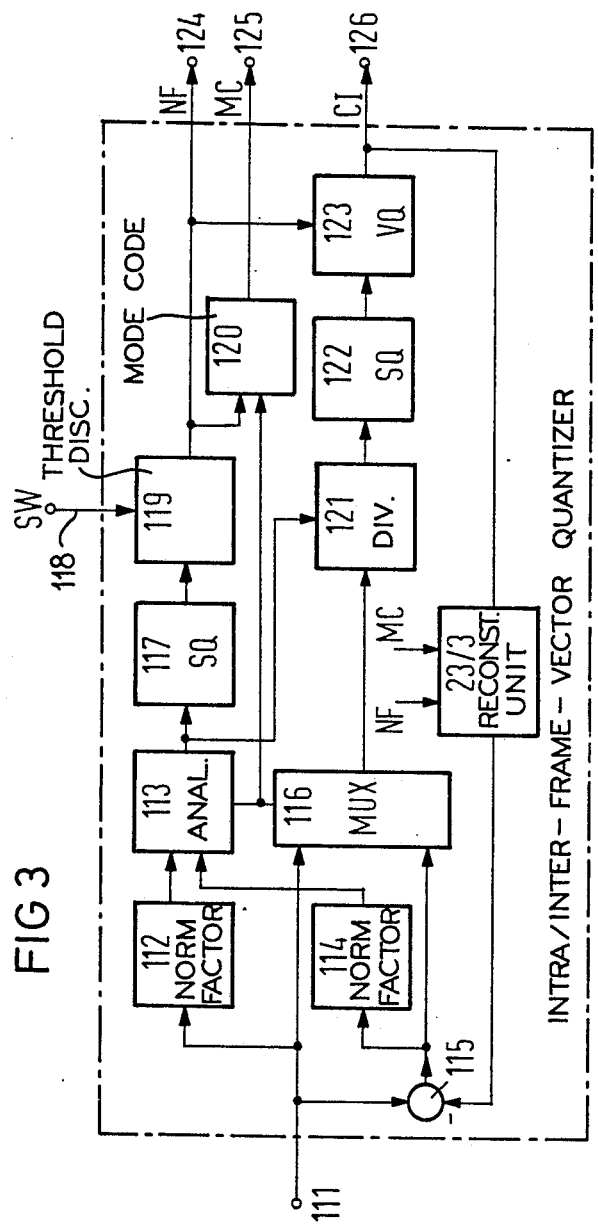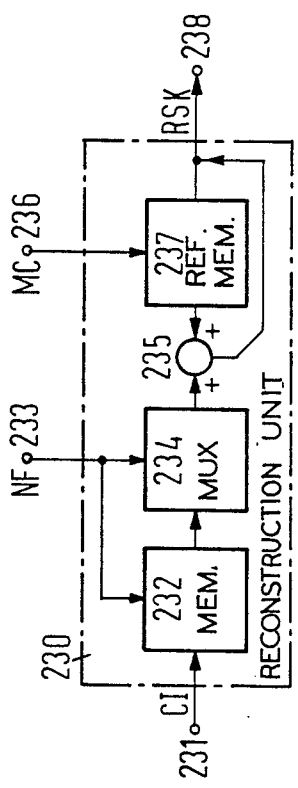

METHOD FOR DATA REDUCTION OF DIGITAL VIDEO SIGNALS BY VECTOR QUANTIZATION OF COEFFICIENTS ACQUIRED BY ORTHONORMAL TRANSFORMATION WITH A SYMMETRICAL NEARLY, CYCLICAL HADAMARD MATRIX

This is a continuation of application Ser. No. 032,176, filed Mar. 30, 1988, now abandoned.

BACKGROUND OF THE INVENTION

The present invention represents an improvement of a method for data reduction of digital video signals in a coder by vector quantization of coefficients acquired by an orthonormal transformation with a symmetrical, nearly cyclical Hadamard matrix and for reconstruction in a decoder. As described in my copending patent application Ser. No. 938,143, filed Dec. 4, 1986, an incoming video signal is divided into n blocks before the transformation, whereby the k elements of a two-dimensional block are arranged in an input vector according to a Peano curve in a first stage, and whereby a mean value coefficient and $k-1$ structure coefficients are formed by the transformation of the input vector, these approximately being a series development of the AC component of the input vector with pseudo-random functions.

The disclosure of my aforesaid application is incorporated by reference into this application.

Great interest in the data reduction of pictures has developed in recent years, for use for transmission of video motion pictures within new digital communications networks, for example a ISDN (Integrated Services Digital Network). Areas of employment exist, for example, in the field of so-called video conferences or of picture telphony, with transmission rates from 2 Mbits/s down to 64 kbits/s.

Such methods for data reduction of digital video signals by vector quantization have proven promising for accomplishing these tasks. Vector quantization seems superior to other, known source coding methods since it allows a data reduction close to the theoretical limit value, provided that the length m of the vectors is chosen to be of adequate size.

Vector quantization views a block of successive information parts, for example the samples of a picture, as a vector that is quantized as a unit. In contrast to a scalar quantization, vector quantization takes into consideration the statistical dependencies of the information parts on one another.

A vector quantizer seeks a k-dimensional vector from a finite set of output vectors, in what is referred to as the code book, that has the greatest similarity to the input vector. The code book index of this vector is coded with a binary code word having the length $L = \log_2 N$, in which N indicates the plurality of output vectors or the size of the code book. Differing from scalar quantization, the plurality $R = L/k$ of bits required in order to code a vector component can be a fraction of 1.

The main hurdle in the employment of vector quantization is its complexity, which rises exponentially with R and k, i.e. a vector quantizer that works with vectors having the length k and a rate of R bits/component requires $k2^{Rk}$ operations for the code book search and a code book memory location of the same order of magnitude. In most applications, therefore, the block size k is limited to 16 for vector quantizing. The consequence of vectorially quantizing pictures with such small block size is that highly visible reconstruction errors appear at the block boundaries. The errors are of mainly two types, namely:

a step-like reconstruction of picture edges, caused by independent processing of the picture blocks, and discontinuities of the gray level from block to block, whereas the gray levels of the original picture change gradually (block contouring).

In order to overcome this problem, a vector quantizing with what is referred to as an M-Hadamard transformation (MHT) is used. This type of transformation is well-suited for preventing the contouring effect.

Further advantages of the vector quantization of M-Hadamard coefficients of digital video signals is the splitting of the signal of a block of k video samples into a mean value coefficient that is proportional to the constant part of the video block, and into $k-1$ structure coefficients that represent the changing part or the structure of the block. For data reduction of the video block, its $k-1$ structure coefficients are vectorily quantized and its mean value coefficient is scalarly quantized. In order to boost the data reduction, this pattern can be cascaded, in that the mean value coefficients of k neighboring blocks are in turn combined in a vector, and are processed in the same way as set forth above.

A further characteristic of M-Hadamard coefficients is that the span w of their structure coefficients $y_i$:

$$w = \max_i y_i - \min_i y_i, \ i = 2,k$$

is linearly dependent on the standard deviation of the structure coefficients:

$$\sigma = \sqrt{\frac{1}{k-2} \sum_{i=2}^{k} (y_i - Y)^2} \quad \text{with} \ y = \frac{1}{k-1} \sum_{i=2}^{k} y_i$$

From this it follows, significantly, that the smallest span of the differences of the vector elements can be employed as a search criterion for searching a representative vector in the code book, as an equivalent measure for the smallest mean quadratic error of the vector elements that is usually employed. Since no multiplications are required for calculating the span, the computational and circuit complexity can be kept low.

The principles of M-Hadamard transformation are described in Siemens Forschungs- und Entwicklungsberichte, Vol. 13 (1984), No. 3, pp. 105-108 and from "Frequenz" 39 (1985) ⅞, pp. 226-234. The dissertation, "Transformationscodierung von digitalisierten Grautonbildern mit M-Sequenzen" by Bernard Hammer (1982) is concerned in detail with the problems of transformation coding.

The known vector quantizing methods for data reduction of video signals have the disadvantage that vectors having k elements must be processed for quantizing a block of k video samples. The mean squared error, or alternatively but with a considerably poorer result, the mean error quantity of the vector elements of the input vector and of the representative vector, are usually employed for searching a representative vector in the code book.

Greater complexity and an increased cost are required for storing the code book, as well as for a more complex computational circuit for carrying out the code book search, using a vector quantizing method.

SUMMARY OF THE INVENTION

The object of the present invention is to provide an improved method, so that a higher degree of data reduction of digital video signals is achieved.

This object is acheived by a method in which the coefficients are in part only scalarly quantized and in part scalarly and vectorially quantized.

BRIEF DESCRIPTION OF THE DRAWINGS

The present invention shall be set forth in detail below with reference to a number of FIGURES relating to exemplary embodiments of the invention in which:

FIG. 3 shows a block circuit diagram of what is referred to as an INTRA/INTERFRAME vector quantizer for the implementation of the method of the invention; and FIG. 4 shows a block circuit diagram of a reconstruction unit for the implementation of the method of the invention.

DESCRIPTION OF THE PREFERRED EMBODIMENT

Figure 1:
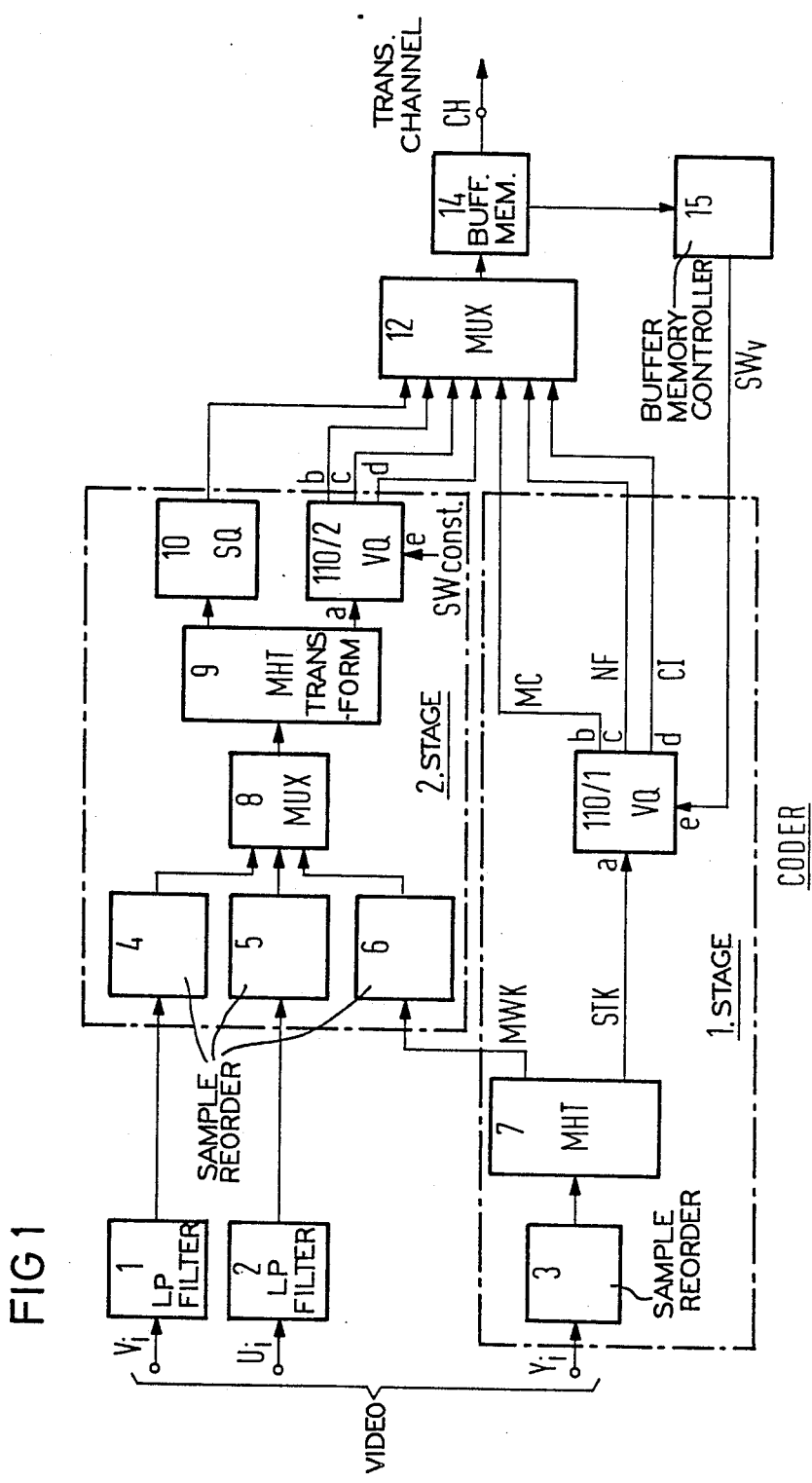
FIG. 1 shhows a block circuit diagram of a coder for the implementation of the method of the invention.
Figure 2:
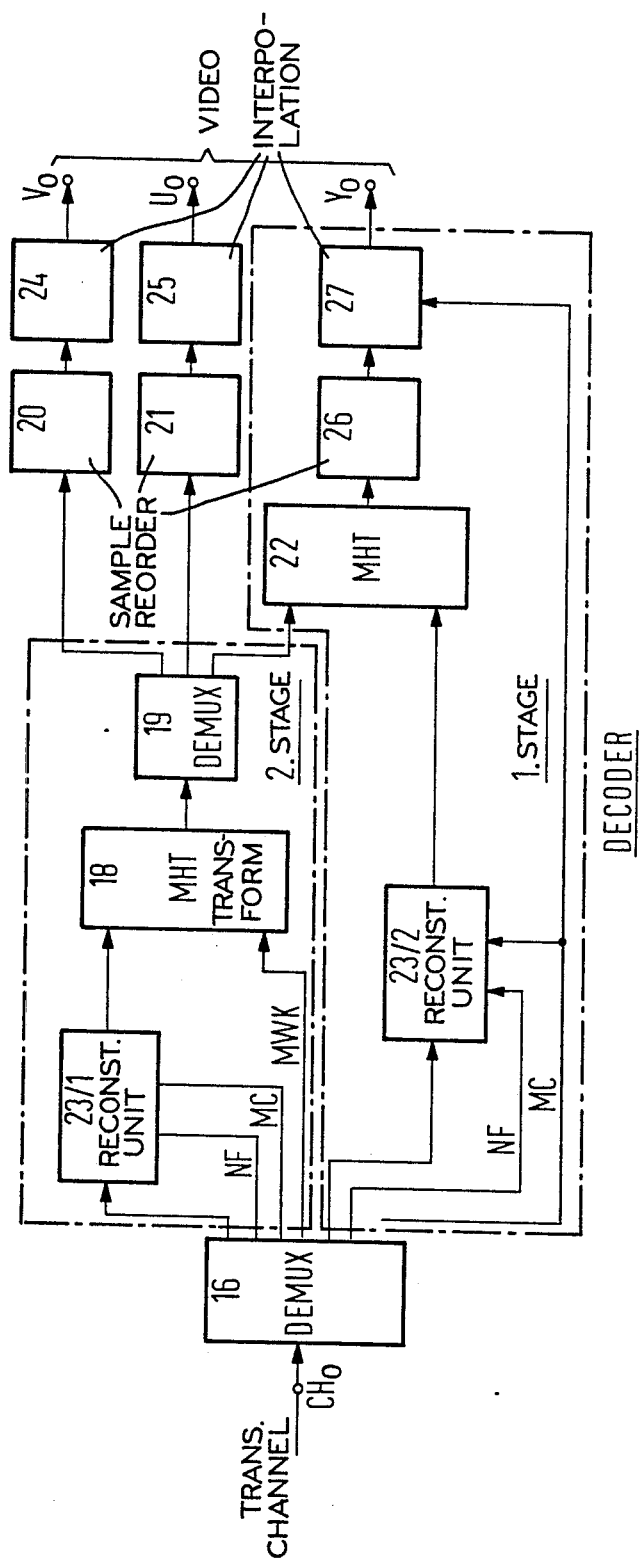
FIG. 2 shows a block circuit diagram of a decoder for the implementation of the method of the invention.

FIGS. 1 and 2 respectively show a coder and a decoder, these facilities being respectively arranged at the beginning and end of a transmission channel for the digital video signals that are to be data-reduced by the method of the invention. FIG. 3 shows the block circuit diagram of an INTRA/INTERFRAME vector quantizer that is twice contained within the coder of FIG. 1. FIG. 4 shows a reconstruction unit that is twice contained in the decoder of FIG. 2, and once in the INTRA/INTERFRAME vector quantizer of FIG. 3.

A digital video signal that is to be data-reduced before transmission via a digital transmission channel having a relatively low data rate is supplied to the coder (FIG. 1) via input terminals $V_i$, $U_i$ and $Y_i$. The luminance component of the video signal is supplied to the input terminal $Y_i$ and the chrominance components of this signal are supplied to the input terminals $V_i$ and $U_i$. A digital low-pass filter 1 having lower sampling function is connected to the input terminal $V_i$ and a digital low-pass filter 2 having lower sampling function is connected to the input terminal $U_i$. The filter 1 is connected to a sample reordering unit 4 whose output is supplied to a first input of a multiplexer 8. The low-pass filter 2 has its output connected to an input of a sample reordering unit 5 whose output is connected to a second input of the multiplexer 8. The input terminal $Y_i$ for the luminance component is connected to the input of a further sample reordering unit 3 whose output is connected to an MHT transformation unit 7 from which an output that emits a mean value coefficient MWK is connected to the input of a further sample reordering unit 6 whose output is connected to a third input of the multiplexer 8. The output of the multiplexer 8 is connected to the input of a further MHT transformation unit 9 from which an output is connected to the input of a scalar quantizer 10 whose output is connected to a first input of a multiplexer 12. A second output of the MHT transformation unit 9 is connected to an INTRA/INTERFRAME vector quantizer 110/2, via the input terminal a thereof, the first output terminal b thereof being connected to a second input of the multiplexer 12. A second output c of the vector quantizer 110/2 is connected to a third input of the multiplexer 12 and a third output d of the vector quantizer 110/2 is connected to a fourth input of the multiplexer 12. Via a side input e, the vector quantizer 110/2 is supplied with a signal for a constant threshold. A second output of the MHT transformation unit 7 supplies structure coefficients STK to an input a of a second vector quantizer 110/1. A first output b of the second vector quantizer 110/1 supplies a mode code MC to a fifth input of the multiplexer 12. A second output c of the vector quantizer 110/1 is connected to a sixth input of the multiplexer 12 and supplies a signal for a norming factor NF. A third output d of the second vector quantizer 110/1 is connected to a seventh input of the multiplexer 12 and supplies a signal for a codebook index CI. A side input e of the vector quantizer 110/1 is supplied with a variable signal for a threshold from a buffer member controller 15 that is supplied with signal from a buffer member 14 which has its input connected to the output of the multiplexer 12 and has its output connected to the input $CH_i$ of the transmission channel.

The decoder of FIG. 2 is arranged at the end of the transmission channel, connected to an input terminal $CH_o$. The input terminal $CH_o$ is connected to the input of the demultiplexer 16. A first output of the demultiplexer is connected to an input of a reconstruction unit 23/1. A second output of the demultiplexer 16 is connected to supply a signal MF to a first side input of the reconstruction unit 23/1 and a third output of the demultiplexer 16 is connected to supply a signal MC to a second side input of the reconstruction unit 23/1. An output of the reconstruction unit 23/1 is connected to a first input of an MHT transformation unit 18 and a fourth output of the demultiplexer 16 is connected to supply a signal MWK to a second input of this MHT transformation unit 18. An output of this transformation unit 18 is connected to an input of a further demultiplexer 19. A first output of this demultiplexer 19 is connected to an input of a sample reordering unit 20. The output of this sample reordering unit 20 is in communication with an input of an interpolation unit 24. The output of this interpolation unit 24 is connected to a terminal $V_o$ for one of the chrominance components of the reconstructed digital video signal. A second output of the second multiplexer 19 is connected to an input of a second sample reordering unit 21 whose output is connected to a second interpolation unit 25. The output of this second interpolation unit 25 is connected to a terminal $U_o$ for the second chrominance component of the reconstructed digital video signal. A third output of the second demultiplexer 19 is connected to a first input of a second MHT transformation unit 22. A fifth output of the first demultiplexer 16 is connected to an input of a second reconstruction unit 23/2 whose output is connected to a second input of the second MHT transformation unit. The sixth and seventh outputs of the first demultiplexer 16 are connected to supply signals NF and MC to first and second side inputs of the second reconstruction unit 23/2, and the MC signal is also connected to a side input of an interpolation unit 27, for what is referred to as a conditional interpolation. The output of the second MHT transformation unit 22 is connected to an input of the third sample reordering unit 26 whose output is connected to an input of the third interpolation unit 27, for what is referred to as the conditional interpolation. Finally, the output of the third interpolation unit 27 is connected to a terminal $Y_o$ for the luminance component of the reconstructed digital video signal.

FIG. 3 shows a block circuit diagram of an INTRA/INTERFRAME vector quantizer 110 that is repeatedly provided in the overall arrangement. An input terminal 111 of this vector quantizer is connected to an input of a norming factor calculator unit 112, to a first input of a multiplexer 116 and to a first input of a subtraction element 115. The output of this subtraction element 115 is connected, first, to a second input of the multiplexer 116 and, second, to an input of a norming factor calculator unit 114. The output of the first-cited norming calculator unit 112 as well as the output of the norming factor calculator unit 114 are conducted to inputs of an analysis unit 113. An output of the this analysis unit 113 is connected, first to a side input of the multiplexer 116 and, second, to one of two inputs of a mode coder 120. Another output of the analysis unit 113 is connected, first, to an input of a scalar quantizer 117 and, second, to a side input of a divider element 121. The output of the scalar quantizer 117 is connected to an input of a threshold discriminator 119 of which a side input 118 is supplied with a signal SW for a threshold. The output of the threshold discriminator 119 is connected to a second input of the mode coder 120 as well as to a side input of the vector quantizer 123 and to an output terminal 124 for a norming factor signal NF. The output of the mode coder 120 is connected to a further output terminal 125 for a mode code signal MC. The output of the multiplexer 116 is connected to the input of the divider element 121, whose output is connected to an input of a further scalar quantizer 112. The output of this scalar quantizer 112 is connected to an input of a vector quantizer 123 whose output leads, first, to a third output terminal 126 for a codebook index signal CI and, to an input of a reconstruction unit 23/3. The output of this reconstruction unit 23/3 is connected to the second input of the difference element 115. Via two side inputs, the reconstruction unit 23/3 is supplied with a NF signal for a norming factor and an MC signal for mode code.

FIG. 4 shows a block circuit diagram of the reconstruction unit which is repeatedly employed in the arrangement set forth above. An input terminal 231, via which a codebook index signal CI is supplied, is connected to an input of a code book memory unit 232, and an input terminal 233, via which a norming factor NF is supplied, is connected to a side input of this memory unit. The output of this codebook memory 232 is connected to an input of a multiplier 234 to which a norming factor is supplied via the side input 233. The output of this multiplier 234 is connected to an input of an adder element 235 whose output is connected, first to an input of a reference memory 237 and, second, to an output terminal 238 for a reconstructed structure coefficient RSK. The reference memory 237 is supplied with a mode code word MC by a side input terminal 236. The output of the reference memory is connected to the second input of the adder element 235.

The method of the invention will now be described, in relation to the above-described circuit arrangements.

In the method of the invention for data reduction of digital video signals in a coder by vector quantization of coefficients acquired by an orthonormal transformation with a symmetrical, nearly cyclical Hadamard matrix and for reconstruction in a decoder, an incoming video signal is subdivided into n blocks before the transformation, whereby the k elements of a two-dimensional block are arranged in an input vector in a first stage in accord with a Peano curve, and whereby the transformation of the input vector forms a mean value coefficient and k-1 structure coefficients that approximately represent a series development of the changing part of the input vector in accord with pseudo-random functions, as already disclosed in the above-identified German patent application No. P 35 42 931.3. The method of the present invention represents an advantageous improvement to the effect that the degree of data reduction can be further intensified.

In accord with the method of the present invention, the mean value coefficients of k neighboring blocks are again subdivided into n/k blocks in a second stage (FIG. 1) incorporating the units 4-10 and 110/2, whereby the k block elements of a two-dimensional block are in turn arranged in an input vector in accord with a Peano curve, and whereby a mean value coefficient and k−1 structure coefficients are in turn formed by transformation of the input vector in transformation unit 9. The mean value coefficient of the second stage is scalarly quantized in the scalar quantizer 10 and transmitted to the decoder. The structure coefficients, or the difference between these structure coefficients and the corresponding, reconstructed structure coefficients of the preferably immediately chronologically preceding picture, of the first stage (incorporating the units 3, 7 and 110/1) and the second stage (incorporating units 3–9, 110/1 and 110/2) are respectively data-reduced by the vector quantization units 110/1 and 110/2, whereby the difference is vector-quantized when the span of the structure coefficient difference is smaller than the span of the structure coefficients themselves. This span, which is referenced as norming factor NF, is scalarly quantized and compared to a threshold SW, in the I/I vector quantizer (FIG. 3). The norming factor NF is set to zero when it falls below the threshold SW. The quantized norming factor is transmitted through the multiplexer 12 to the decoder (FIG. 2) when it exceeds the threshold SW. A mode code word MC from which the threshold decision proceeds, and which indicates whether the structure coefficients or the structure coefficient differences have been vector-quantized, is also transmitted through the multiplexer 12 to the decoder (FIG. 2). The structure coefficients or the structure coefficient differences having a norming factor above the threshold SW are normed before their vector quantization by being divided by their norming factor by the unit 121 (FIG. 3). The normed structure coefficients or structure coefficient differences are uniformly scalarly quantized in unit 122 before the vector quantizing in unit 123, the normed and scalarly quantized structure coefficients or structure coefficient differences forming the input vector for the vector quantizing. In the operation for the vector quantizing, the index of that vector from a code book memory 232, for which the span of differences between its vector elements and those of the input vector comprise a minimum, is identified. The index search takes place only in a sub-region of the codebook 232 which is determined by the quantized norming factor. The codebook index CI is transmitted via multiplexer 12 to the decoder (FIG. 2). The reconstruction unit reconstructs the structure coefficients and stores them, so that the quantized, normed structure coefficients or structure coefficient differences allocated to the code-book index CI and to the quantized norming factor NF, are read out from the codebook 232. These are multiplied by the quantized norming factor and, dependent on the mode code word MC, are added to the structure coefficient differences of the reconstructed structure coefficients of the preferably immediately temporal preceding picture that are stored in the reference memory 237, or to the structure coefficient zero, and the result is stored in the reference memory 237. With the same reconstruction unit 23/1 as in the coder (FIG. 1), the decoder (FIG. 2) reconstructs the structure coefficients of the second stage of the coder (FIG. 1) from the codebook index CI, the quantized norming factor and the mode code word. By transformation, the mean value coefficients of the first stage of the coder (FIG. 1) are reconstructed from these structure coefficients and the mean value coefficient. With the same reconstruction unit 23/2 as in the coder (FIG. 1), the decoder (FIG. 2) reconstructs the structure coefficients of the first stage of the coder (FIG. 1) from the codebook index, the quantized norming factor and the mode code word. An input vector of the coder (FIG. 1) is reconstructed by transformation from these $k-1$ structure coefficients and from the reconstructed mean value coefficient.

The elements of the input vector are arranged in a two-dimensional block in accord with hthe Peano curve. The reconstructed video signal arises by arranging n blocks formed in this way in accord with the raster used by the coder.

It is advantageously provided that a constant threshold $SW_c$ is utilized in the second stage of FIG. 1.

Another development of the invention provides that the lower-sampled chrominance components of the digital video signal are treated like the mean value coefficients of the second stage of FIG. 1.

For certain applications, a circuit arrangement having at least one third stage interconnected cascade-like to the first and the second stage is advantageous.

A further advantageous development of the invention provides a circuit arrangement for the implementation of the method wherein a buffer memory 14 is arranged at the output of the coder (FIG. 1), the filling degree of this buffer memory 14 controlling the threshold $SW_v$ of the first stage of the coder (FIG. 1) via a proportional controller 15. This buffer memory 14 is intended to output signals having a constant data rate at its output, with signals having a variable data rate supplied to its input, and to transmit them to the decoder (FIG. 2) via the transmission channel.

Another development of the invention avoids visible block boundaries in the reconstructed video signal that can be produced by using a threshold that is too high for the first stage of the coder (FIG. 1), avoiding these by reconstruction of the video elements of the associated block by means of two-dimensional low-pass filter interpolation. The mean value coefficient of the block itself, and the mean value coefficients of the blocks directly and indirectly spatially adjacent, are used as supporting values of the interpolation. When the video elements of the directly adjacent blocks are reconstructed from structure coefficients of the first stage of the coder, then the arithmetic mean of the reconstructed picture elements that lie at the edge of the block to be reconstructed are used as supporting values instead of the mean value coefficient.

It will be apparent to those skilled in the art that the various modifications and additions may be made in the apparatus and methods of the present invention, without departing from the essential features of novelty thereof, which are intended to be defined and secured by the appended claims.

What is claimed is:

1. A method for data reduction of digital video signals in a coder by vector quantization of coefficients acquired by an orthonormal transformation with a symmetrical, nearly cyclical Hadamard matrix and for reconstruction in a decoder, whereyby an incoming video signal is sub-divided into n blocks of k video samples each in accord with a raster before the transformation, whereby the elements of a two-dimensional block are arranged in an input vector according to a Peano curve in a first stage, and whereby the transformation of the input vector forms a mean value coefficient and $k-1$ structure coefficients that approximately represent a series development of the changing part of the input vector in accord with pseudo-random functions, comprising the steps of;

sub-dividing the mean value coefficients of k neighboring blocks in turn, into n/k blocks in a second stage, whereby the k block elements of a two-dimensional block are again arranged in an input vector in accord with a Peano curve, whereby a mean value coefficient and $k-1$ structure coefficients are again formed by transformation (9) of the input vector;

scalarly quantizing the mean value coefficient of the second stage and transmitting it to the decoder;

data reducing the structure coefficients or the difference between the structure coefficients and the corresponding, reconstructed structure coefficients of the immediately temporal preceding picture of the first and of the second stage by a vector quantization, whereby the difference is vector-quantized when the span of the structure coefficient difference is smaller than the span of the structure coefficients themselves;

scalarly quantizing said span, which is referred to as a norming factor (NF), comparing said quantized span to a threshold (SW);

setting the norming factor (NF) to zero when it falls below the threshold (SW)

transmitting the quantized norming factor (NF) to the decoder when it lies above the threshold (SW);

transmitting a mode code word (MC) to the decoder, to identify the threshold decision, to designate whether the structure coefficients or the structure coefficient differences were vector-quantized;

norming the structure coefficients or the structure coefficient differences whose norming factor (NF) lies above the threshold (SW) by division (121) by their norming factor (NF);

scalarly quantizing the normed structure coefficients or structure coefficient differences uniformly and performing vector quantizing (123) on them;

forming an input vector for said vector quantizing from the normed and scalarly quantized structure coefficients or structure coefficient differences;

identifying the index of that vector from a codebook (232) for which the span of the differences between its vector elements and those of the input vector comprise a minimum by searching only a sub-region of the codebook (232) which is determined by the quantized norming factor (NF);

transmitting the codebook index (CI) to the decoder;

reconstruction and storing the structure coefficients by reading out the quantized, normed structure coefficients or structure coefficient differences allocated to the codebook index (CI) and to the quantized norming factor (NF) from the codebook (232), and multiplying them by the quantized norming factor (NF), and, dependent on the mode code word (MC), adding them to a zero coefficient or to the structure coefficient differences of the reconstructed structure coefficients of the preferably immediately temporal preceding picture that are stored in a reference memory (237) and storing the result in the reference memory (237);

reconstructing, with the same reconstruction unit (23/1) as in the coder, the structure coefficients of the second stage from the codebook index (CI), the quantized norming factor (NF) and the mode code word (MC);

reconstructing the mean value coefficients of the first stage of the coder by transformation from these structure coefficients and the mean value coefficient;

reconstructing, with the same reconstruction unit (23/2) as in the coder, the structure coefficients of the first stage of the coder from the codebook index (CI), the quantized norming factor (NF) and the mode code word (MC);

reconstructing an input vector of the coder by transformation from these $k-1$ structure coefficients and the reconstructed mean value coefficient;

arranging the elements of the input vector in a two-dimensional block in accord with a Peano curve; and arranging the reconstructed video signal into n blocks formed in accord with the raster used by the coder.

2. The method according to claim 1, including the step of using a constant threshold ($SW_c$) in the second stage.

3. The method according to claim 1, including the step of treating the lower-sampled chrominance components of the digital video signal like the mean value coefficients of the second stage.

4. Coder apparatus for data reduction with digital video signals by vector quantization of coefficients acquired by orthonormal transformation with a symmetrical, nearly cyclical Hadamard matrix, incorporating means for subdividing an incoming video signal into n blocks of k video samples, each in accord with a raster before the transformation, a first stage for arranging the elements of a two dimensional block in an input vector according to a Peano curve, whereby the transformation of the input vector forms a mean value coefficient and $k-1$ structure coefficients that approximately represent a series development of the changing part of the input vector, in accord with pseudorandom functions, a second stage for subdividing the mean value coefficients of k neighboring blocks in turn, into n/k blocks, whereby the k block elements of a two dimensional block are again arranged in an input vector in accordance with a Peano curve whereby a mean value coefficient and $k-1$ structure coefficients are again formed by transformation of the input vector, means for scalarly quantizing the mean value coefficient of the second stage and transmitting it to said decoder, means for performing a vector quantization for reducing the structure coefficients or the difference between the structure coefficients and the corresponding, reconstructed structure coefficients of the immediately temporal preceding picture of the first and of the second stage, whereby the difference is vector-quantized when the span of the structure coefficient difference is smaller than that of the structure coefficients themselves, means for scalarly quantizing said span to obtain a norming factor, means for comparing said quantized span to a threshold and for setting the norming factor to zero when it falls below said threshold, means for transmitting the quantized norming factor to the decoder when it exceeds said threshold, means for transmitting a mode control word to the decoder, to identify the threshold decision for designating whether the structure coefficients or the structure coefficient differences were vector quantized, means for norming the structure coefficients or the structure coefficient differences whose norming factor exceeds the threshold by division by their norming factor, means for scalarly quantizing the normed structure coefficients or structure coefficient differences uniformly and performing vector quantizing on them, means for forming an input vector for said vector quantizing from the normed and scalarly quantized structure coefficients or structure coefficient differences, means for identifying the index of that vector from a codebook for which the span of the differences between its vector elements and those of the input vector comprises a minimum by searching only a sub-region of the code book which is determined by the quantized norming factor, means for transmitting the codebook index to the decoder, means for reconstructing and storing the structure coefficients by reading out the quantized normed structure coefficients or structure coefficient differences allocated to the code book index and to the quantized norming factor from the code book and for multiplying them by the quantized norming factor and, depending on the mode code word, adding them to a zero coefficient or to the structure coefficient differences of the reconstructed structure coefficients of the preferably immediately temporal preceding picture that are stored in a reference memory and for storing the result in the reference memory, means for reconstructing, with the same reconstruction unit as in the coder, the structure coefficients of the second stage from the code book index, the quantized norming factor and the mode code word, means for reconstructing the mean value coefficients of the first stage of the decoder by transformation from the structure coefficients and the mean value coefficient, means for reconstructing, with the same reconstruction unit as in the coder, the structure coefficients of first stage of the coder from the code book index, the quantized norming factor and the mode code word, means for reconstructing an input vector of the coder by transformation from these $k-1$ structure coefficients and the reconstructed mean value coefficient, means for arranging the elements of the input vector in a two dimensional block in accord with a Peano curve and for arranging the reconstructed video signals into n blocks formed in accord with the raster used by said coder, and including at least one third stage interconnected cascade-like with said first and second stages.

5. Apparatus for data reduction of digital video signals in a multistage coder with a variable threshold, which digital video signals are transmitted to a decoder, comprising a buffer memory (14) connected to the output of the coder, means for controlling the threshold ($SW_V$) of the first stage of said coder via a proportional controller in response to the degree of filling of said buffer memory, and means connected to said buffer memory for producing signals having a constant data rate in response to signals having a variable data rate supplied thereto and for transmitting said signals to the decoder (FIG. 2) via the transmission channel, and including a low-pass filter, means for producing structure coefficients corresponding to structure coefficients of said first stage, and wherein said decoder is operative to form a block of picture elements by two dimensional interpolation, using said low-pass filter, when said structure coefficients are equal to zero, means for forming values of the interpolation from the mean value of the coefficient of said block and from the mean values of coefficients of blocks that are directly and indirectly spatially adjacent, and means for using, as values for the interpolation, values derived from adjacent blocks for which said structure coefficients are unequal to zero, whereby the arithmetic mean of the picture elements that lie on the edge of a block of picture elements are used instead of said mean value coefficient.

* * * * *